Dec. 9, 1924.                                                    1,518,393
               B. P. CURRIER
      PRISM ATTACHMENT FOR LENS MEASURING INSTRUMENTS
          Filed Aug. 11, 1922        2 Sheets-Sheet 1
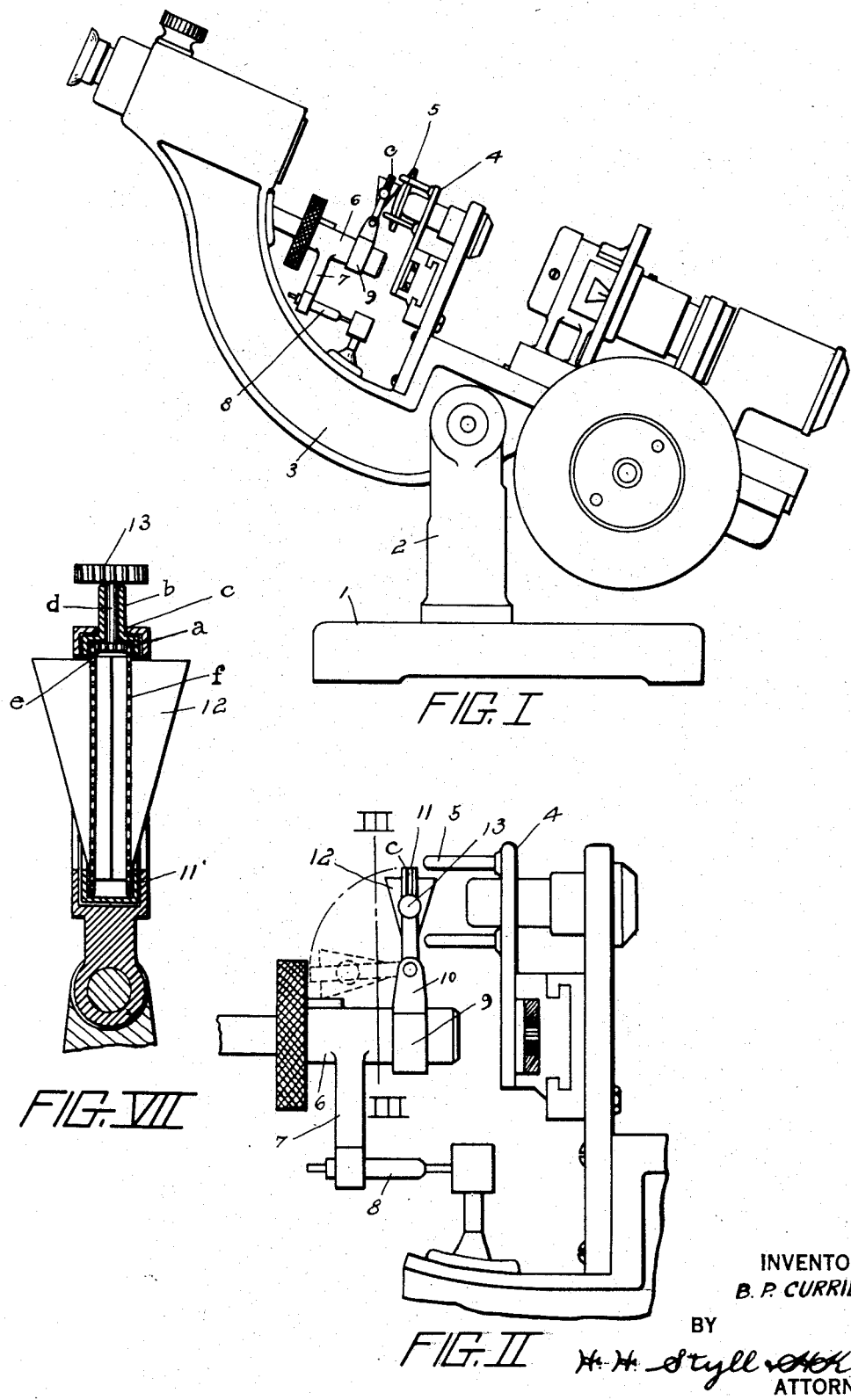
FIG. I
FIG. VII
FIG. II
INVENTOR
B. P. CURRIER
BY
H. H. Styll  A. H. Parsons
ATTORNEYS Dec. 9, 1924.                                                              1,518,393
B. P. CURRIER
PRISM ATTACHMENT FOR LENS MEASURING INSTRUMENTS
Filed Aug. 11, 1922     2 Sheets-Sheet 2
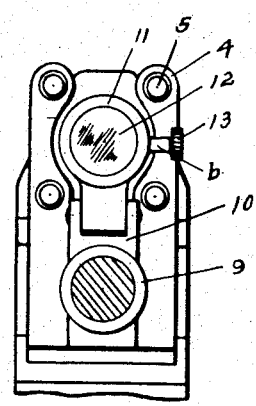
FIG. III
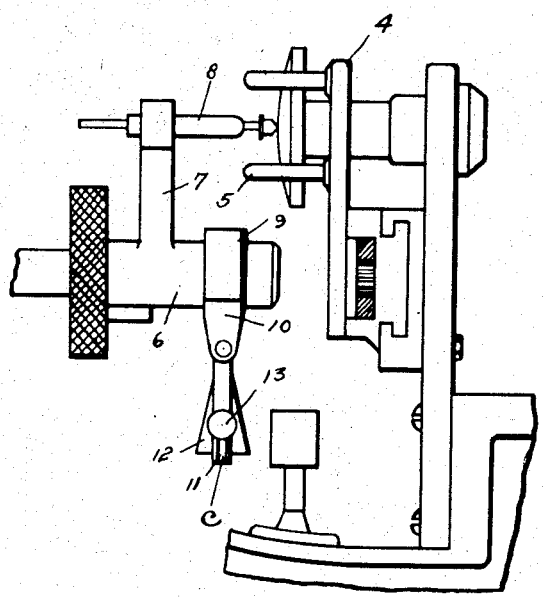
FIG. IV
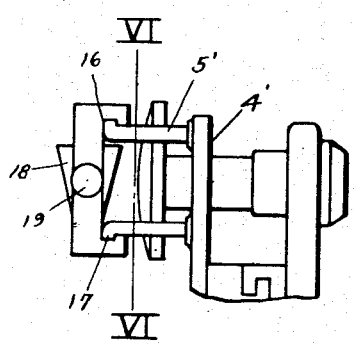
FIG. V
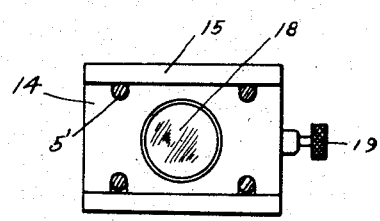
FIG. VI
INVENTOR
B. P. CURRIER
BY
ATTORNEYS Patented Dec. 9, 1924.

1,518,393

UNITED STATES PATENT OFFICE.

BERNARD P. CURRIER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

PRISM ATTACHMENT FOR LENS-MEASURING INSTRUMENTS.

Application filed August 11, 1922. Serial No. 581,065.

*To all whom it may concern:*

Be it known that I, BERNARD P. CURRIER, a citizen of the United States, residing at Southbridge, in the county of Worcester and State of Massachusetts, have invented certain new and useful Improvements in Prism Attachments for Lens-Measuring Instruments, of which the following is a specification.

This invention relates to new and useful improvements in lens measuring instruments, and more particularly to an instrument for measuring the vertex powers, such as spherical powers, astigmatic powers, axis and prism displacement of ophthalmic lenses.

The object of this invention is to provide means in a lens measuring instrument of the character referred to, to determine the amount of prism and the angle of that prism in the finished ophthalmic lens being tested.

A further object of the invention is the provision of an attachment for a lens measuring instrument so constructed and mounted as to be readily accessible for use and at the same time may be quickly and readily moved out of the way when not in use.

With the above and other objects in view the invention consists in the novel features of construction, the combination and arrangement of parts hereinafter more fully set forth, pointed out in the claims and shown in the accompanying drawings, in which—

Figure I is a side elevation of a lens testing instrument illustrating my improved prism attachment applied thereto.

Figure II is a detail enlarged view of part of the machine disclosing the operative position of my improved attachment.

Figure III is a vertical sectional view taken on the line III—III of Figure II.

Figure IV is a view similar to Figure II illustrating the attachment in an inoperative position.

Figure V is a detail side elevation illustrating a slightly modified form of the invention.

Figure VI is a sectional view taken on the line VI—VI of Figure V, and

Figure VII is an enlarged vertical sectional view taken thru the prism holder.

Referring now more particularly to the drawings in which various reference characters indicate the various parts thruout the drawings the numeral I indicates a base member having a standard 2 mounted thereon to the upper end of which is pivoted the body 3 of the lens measuring instrument having an optical system adapted to measure the spherical and astigmatic powers of an ophthalmic lens inserted in the optical system. The construction of the body includes a sliding lens holder 4 carrying the lens clamping pins 5 for retaining the lens to be measured in position. Arranged in front of the lens holder 4 is the adjustable sleeve 6 carrying the arm 7 which supports the ink marking pins 8 used to dot the geometrical horizontal line of the lens under examination.

My prism attachment includes in its construction a sleeve 9 secured to the sleeve 6 and has spaced ends 10. Pivoted between the ends 10 is the prism lens holder 11, said holder being in the form of a channeled ring 11′ and mounted for rotating movement within this channeled ring is a supporting ring $a$ U shaped in cross section as shown in Figure VII and in which the double rotary prism lenses 12 are mounted. Formed integral with the supporting ring $a$ is a sleeve $b$ which extends out thru an arcuate slot $c$ formed in the ring 11′. Mounted for rotation within the sleeve $b$ is a pin $d$ having a finger piece 13 at its outer end with the pinion $e$ at its inner end, said pinion meshing with the gears $f$ carried by the double rotary prisms 12. From this it will be apparent that the double rotary prisms 12 may be rotated in opposite directions as they are disposed upon opposite sides of the center of the ring 11′. Attention is also called to the fact that various relative positions of the double rotary prisms may be obtained by moving the sleeve $b$ within the slot $c$ for changing the angles of the prisms. This construction provides what is commonly called a double rotary prism unit, by which any power within its range may be obtained by the relative rotation of the two prisms, and this double rotary prism unit may be thrown into or out of alignment with the optical system of the lens measuring instrument.

In the use of the instrument a lens is placed between the pins 5 on the lens holder 4 in direct alignment with the optical system of the instrument. Then the double rotary prism is thrown into alignment with the optical system; the prisms are rotated with respect to each other and also together as a unit until the target as seen through the lens to be tested is centered. The prismatic power and angle of the prism may be obtained from the double rotary prism. Then the spherical and astigmatic powers of the lens may be measured in the usual way. After this it is advisable to repeat the measurement of the prism power and angle of the prism to verify them.

After this the double rotary prism is thrown out of alignment with the optical system and the lens may then be marked by the inking pens.

In Figures V and VI, I have illustrated a slightly modified form of the invention wherein a body plate 14 is provided having outturned flanges 15 forming undercut grooves 16 providing retaining fingers adapted to receive the angularly disposed ends 17 of the clamping pins 5' which are carried by the lens holder 4'.

In view of the fact that the ends of the grooves 16 are open the body plate 14 may be readily fitted onto the ends of the pins 5' by sliding the plate longitudinally. The body plate 14 is provided with a central opening in which the prismatic lenses 18 are arranged, said lenses being manipulated thru the medium of the finger piece 19.

It will be apparent from the above description taken in connection with the accompanying drawings that I have provided a means for optically determining the prismatic powers of the lens as well as the spherical and astigmatic powers.

As will be noted from the drawings, Figure VII, a double rotary prism is composed of two wedge shaped prisms 12 placed back to back and secured in holders having gears meshing with a hand pinion which is adapted to rotate the two prisms so that any power of prism from the minimum to the maximum of the combination of the two prisms may be obtained by rotating the prisms to the desired point, as is well understood in the art. The two prisms 12 may not only be rotated with respect to each other, but the whole prism unit may be rotated as a unit in its bearings.

In operation, as has been stated, the double rotary prism unit is thrown into alignment with the optical system of the lens measuring instrument and the target of this instrument viewed through the prisms, these prisms being rotated until the target is centered. The amount of the prism may then be obtained from the reading of the double rotary unit which is provided with proper scales for giving the power of the prism showing the relative relationship of the two prisms as well as the rotation of the prism in its holder as a unit.

It will be understood that the rotary prism unit is only used with the lens measuring instrument when it is desired to measure the amount of the prism that is in the lens which is under test. When the rotary prism is not being used it is thrown out of alignment with the optical system of the lens measuring instrument on its pivot bearing, as has been explained above.

What I claim is:

1. In an instrument for measuring the powers of lenses, in combination with a holder for the lens to be measured located in the optical system of the instrument, a double rotary prism unit, means for holding the double rotary prism unit, and means for moving the double rotary prism unit into and out of alignment with the optical system of the instrument.

2. In an instrument for measuring the powers of lenses, in combination with a holder for the lens to be measured located in the optical system of the instrument, a pair of prisms, means for holding the prisms, means for rotating the prisms with respect to each other, means for rotating the prisms in their holders as a unit, and means for moving the prisms as a unit into and out of alignment with the optical system of the instrument.

3. In an instrument for measuring the powers of lenses, in combination with a holder for the lens to be measured located in the optical system of the instrument, a pair of rotary prisms, means for holding the rotary prisms, and means for detachably engaging the holder of the rotary prisms in alignment with the optical system of the instrument.

4. In an instrument for measuring the powers of lenses, in combination with a holder for the lens to be measured located in the optical system of the instrument, a pair of prisms, means for holding the prisms back to back, means for rotating the prisms with respect to their holder, means for rotating the prisms in their holder as a unit, and means for moving the prisms as a unit into and out of alignment with the optical system of the instrument.

BERNARD P. CURRIER.